No. 12,711. REISSUED OCT. 29, 1907.

J. E. TWITCHELL.

DISPLAY EASEL.

APPLICATION FILED MAR. 17, 1905.

Witnesses

Edwin L. Bradford,

Augustus J. Lix.

Inventor

James E. Twitchell.

By A. H. Olin

Attorney

THE NORRIS PETERS CO., WASHINGTON, D. C.

UNITED STATES PATENT OFFICE.

JAMES E. TWITCHELL, OF DETROIT, MICHIGAN, ASSIGNOR, BY MESNE ASSIGNMENTS, TO J. B. TIMBERLAKE & SONS, OF JACKSON, MICHIGAN.

DISPLAY-EASEL.

No. 12,711. Specification of Reissued Letters Patent. Reissued Oct. 29, 1907.

Original No. 760,403, dated May 17, 1904, Serial No. 173,988. Application for reissue filed March 17, 1905. Serial No. 250,694.

*To all whom it may concern:*

Be it known that I, JAMES E. TWITCHELL, a citizen of the United States, residing at Detroit, county of Wayne, State of Michigan, have invented a certain new and useful Improvement in Display-Easels; and I declare the following to be a full, clear, and exact description of the invention, such as will enable others skilled in the art to which it pertains to make and use the same, reference being had to the accompanying drawings, which form a part of this specification.

This invention relates to display-easels for exhibition purposes; and it has for its object a frame which is especially adapted to hold articles of crockery in a position to display them attractively, as it may be used for displaying plates or a washbowl and pitcher or other similar articles.

Figure 2:
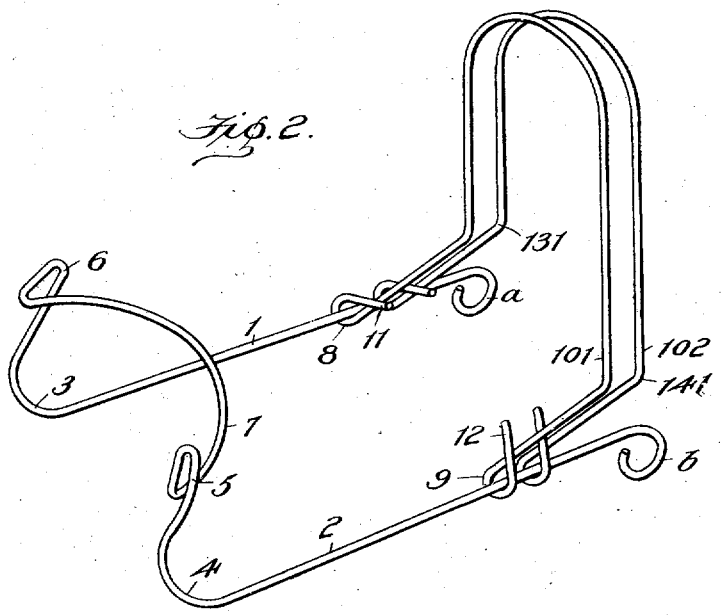
Figure 1:
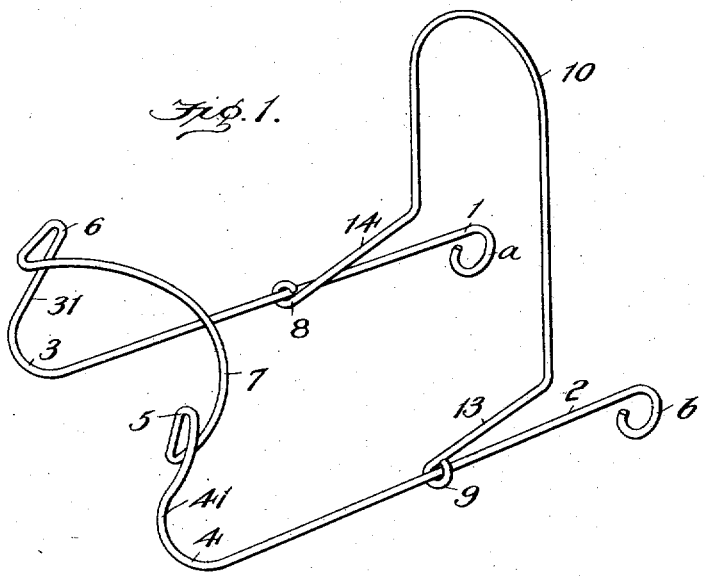

In the drawings, Figure 1 shows an easel having a base with a single standard support adapted to display a washbowl and pitcher. Fig. 2 shows an easel having a base with a number of standard supports adapted to display several plates or saucers, each of which is held independently.

The base for either form is a single wire bent to bring the two guide branches 1 and 2 parallel to each other and connected by an elevated cross-bar 7. The guide branches 1 and 2 are connected to the cross-bar by uprights which curve upward from the branches, and where each upright joins the cross-bar there is made a complete turn of the wire of which the easel is made. At the points 3 and 4, where the branches 1 and 2 join the uprights, are the front rests for the structure. At the turns 5 and 6 the upper part of the loops between the uprights and the cross-bar 7 are bent slightly inward to engage over the flange or rim at the bottom of the pitcher the said turns 5 and 6 serve to offset the cross bar 7 from the uprights at the front of the structure and to maintain its ends at points beneath the tops of the said uprights. The branches terminate with downwardly-curved rests or feet, and both branches are held above the plane of the tangent-points where the easel rests on the table or other support.

*a b* indicate the tangent-points of the feet.

On the branches 1 and 2 is a sliding support or a number of sliding supports, each of which is composed of a loop of wire, with the ends of the wire turned around the guide branches 1 and 2, with the turned ends forming eyes 8 and 9, which hold the loop 10 in sliding engagement with the base part of the easel. When desired the terminals of the wire at each loop 8 and 9 may be extended toward the middle line of the loop and form, with the obliquely-rising parts 13 and 14 of the loop, angular openings in which the edge of any thin article can engage and in which an article, like a plate, will be supported, bearing entirely on the loop 10, which is capable of sliding motion along the base to any desired point, or if there are a number of loops 101, 102, &c., each loop will support an article entirely independent of the articles supported by any other loop, and there is no tendency on the part of one loop with its load to engage against and push a loop in front of it to such an extent that the article will slip out of its proper position for exhibition.

Where it is only intended to use the easel for supporting a single article or a single pair of articles, like a basin and pitcher, one loop is sufficient, and the edge of the basin engages against the standards 31 and 41.

An article leaning against the top of a loop 10 and resting on the ends 11 and 12 produces a twisting strain on the support, which tends to bind the eyes 8 and 9 on the branches of the base and causes the support to assume a very firm and stable position.

Preferably the loop 10 has the lower end of each branch from it bent at an angle to the main or body part of it, giving the portion from the eye to the point 141 or from the eye to the point 131 a slanting position when the main part is vertical.

It will be noted that the nature of the connection between the parallel parts 1, 2 of the forward element of the easel and the upright of the back supporting element is such that the back supporting element may be folded forward upon the front element when desired. This feature of construction is found to be advantageous in the packing and shipping of articles such as herein described.

What I claim is:—

1. In a display easel, in combination, a base having parallel parts 1 and 2, connected by an elevated cross bar 7, a looped wire with terminals one of which is bent around part 1, and another of which is bent around part 2, with the loop arching between the terminals, substantially as described.

2. In a display easel, in combination a base having parallel parts 1 and 2, connected by a cross bar 7 and having turns 5 and 6 between the cross bar 7 and the parts 1 and 2, a looped wire with terminal eyes 8 and 9 engaging the parts 1 and 2, and with ends 11, 12 projecting from the eyes, and with the looped part thereof arching above the base, substantially as described.

3. In a display easel, in combination a base having parallel parts 1 and 2, connected by an elevated cross bar 7 and with curved ends whereby the main portions of the parts 1 and 2 are supported, a looped wire having its terminals bent around the parts 1 and 2 and arching between the terminals, and also having an angular bend between each terminal and the curve of the arch, substantially as described.

4. A display easel having a forward element adapted to support the bottom of a dish or other article, a back supporting element for the article to be displayed having uprights adjustably connected to the said forward element, and adjustable forward and back to various positions between the front and rear end of the said forward element, substantially as set forth.

5. A display easel having in combination a base, and an upright frame connected with the base, adjustable forward and back thereon and having connection with the base arranged to prevent the frame from swinging backward beyond a predetermined point, substantially as set forth.

6. A display easel, having a base part with two parallel guides, in combination with an upright part having its ends connected to the guides, adjustable forward and back thereon, and adapted to engage with said guides to prevent its swinging backward beyond a predetermined limit.

7. A display easel comprising a front element having parallel parts 1 and 2 connected by an elevated cross bar 7, and a back supporting element for the article to be displayed having upright parts connected by a cross bar at their tops and having their lower ends so connected to the parallel parts 1 and 2 of the front element as to permit the adjustment of the upright or back supporting element longitudinally of the front element and to prevent it from swinging backward beyond a predetermined point in its various positions of adjustment.

8. A display easel comprising a front element having parallel parts 1 and 2 connected at their front ends by a cross bar, and a back supporting frame for the article to be displayed having parallel uprights connected by an elevated cross bar, and each connected to one of said parts 1, 2 of the front element, these latter connections being adapted both to permit the adjustment of the said frame longitudinally of the front element and to prevent its swinging backward relatively to said front element beyond a predetermined limit.

9. A display easel comprising a front element having parallel parts 1, 2 with their front ends arranged to form the front rests or supports for the easel, said parallel parts being connected by an elevated cross bar arranged in the rear of their front ends, and a back supporting element for the article to be displayed comprising uprights connected by an elevated cross bar and each having its lower end adjustably connected to one of the parts 1, 2 of the front element.

10. A display easel comprising a front element having parallel parts 1, 2 with their front ends arranged to form the front rests or supports for the easel, said parallel parts being connected by an elevated cross bar, and a back supporting part for the article to be displayed having upright parts connected by a cross bar in a horizontal plane relatively considerably above the cross bar connecting the parallel parts 1 and 2, and each of said uprights having its lower end adjustably connected with one of the parallel parts 1 and 2 of the said forward element.

11. A display easel comprising a front element having parallel side bars 1, 2 arranged at their front ends to provide feet or rests for the front of the easel and connected at their front ends by a cross bar, and the back supporting part for the article to be displayed having uprights connected by a cross bar, each of said uprights having its lower end adjustably connected to the parallel bars 1, 2 in such manner as to permit the said uprights to be adjusted longitudinally of the said forward part to several positions in transverse planes of the easel and in front of the rear ends of the parallel parts 1 and 2 of the said front element.

In testimony whereof I affix my signature in presence of two witnesses.

JAMES E. TWITCHELL.

Witnesses:

CLYDE I. WEBSTER,

J. H. RUSSELL, Jr.